(12) United States Patent
Gilgen

(10) Patent No.: US 7,457,461 B2
(45) Date of Patent: Nov. 25, 2008

(54) VIDEO COMPRESSION NOISE IMMUNITY

(75) Inventor: Robert L. Gilgen, Westford, MA (US)

(73) Assignee: Avocent Corporation, Huntsville, AL (US)

( * ) Notice: Subject to any disclaimer, the term of this patent is extended or adjusted under 35 U.S.C. 154(b) by 599 days.

(21) Appl. No.: 10/875,679

(22) Filed: Jun. 25, 2004

(65) Prior Publication Data

US 2005/0286790 A1    Dec. 29, 2005

(51) Int. Cl.
G06K 9/36    (2006.01)
(52) U.S. Cl. ........................ 382/166; 382/240
(58) Field of Classification Search ............... 382/162, 382/166, 240, 244–248, 232, 233; 375/240.19; 348/398.1, 408.1
See application file for complete search history.

(56) References Cited

U.S. PATENT DOCUMENTS

| | | | |
|---|---|---|---|
| 3,935,379 A | 1/1976 | Thornburg et al. | 358/426.12 |
| 4,005,411 A | 1/1977 | Morrin, II | 341/63 |
| 4,134,133 A | 1/1979 | Teramura et al. | |
| 5,046,119 A | 9/1991 | Hoffert et al. | |
| 5,325,126 A | 6/1994 | Keith | |
| 5,339,164 A | 8/1994 | Lim | |
| 5,497,434 A | 3/1996 | Wilson | |
| 5,519,874 A | 5/1996 | Yamagishi et al. | 709/201 |
| 5,526,024 A | 6/1996 | Gaglianello et al. | 345/547 |
| 5,664,029 A | 9/1997 | Callahan et al. | |
| 5,757,973 A | 5/1998 | Wilkinson | |
| 5,796,864 A * | 8/1998 | Callahan | 382/166 |
| 5,805,735 A | 9/1998 | Chen et al. | |
| 6,008,847 A | 12/1999 | Bauchspies | |
| 6,094,453 A | 7/2000 | Gosselin et al. | |
| 6,124,811 A * | 9/2000 | Acharya et al. | 341/63 |
| 6,233,226 B1 | 5/2001 | Gringeri et al. | 370/252 |
| 6,243,496 B1 | 6/2001 | Wilkinson | |
| 6,304,895 B1 | 10/2001 | Schneider et al. | |
| 6,327,307 B1 | 12/2001 | Brailean et al. | |
| 6,453,120 B1 | 9/2002 | Takahashi | |
| 6,496,601 B1 | 12/2002 | Migdal et al. | |
| 6,512,595 B1 | 1/2003 | Toda | |
| 6,539,418 B2 | 3/2003 | Schneider et al. | |

(Continued)

FOREIGN PATENT DOCUMENTS

EP    0495490    7/1992

(Continued)

OTHER PUBLICATIONS

International Search Report dated Jul. 28, 2003.

(Continued)

*Primary Examiner*—Duy M Dang
(74) *Attorney, Agent, or Firm*—Davidson Berquist Jackson & Gowdey LLP

(57) ABSTRACT

A method of improving run length video encoding commands is described in which all compression commands that require a current pixel value to be compared to a previously sent pixel value to determine whether compression can take place in a longer run is adjusted to relieve stringent match conditions. Instead of requiring an exact match, the compression engine subtracts one pixel value from another, and compares the absolute value of the result to a threshold value. In this way, run lengths can be lengthened for purposes of compression and compression efficiency can be increased.

16 Claims, 9 Drawing Sheets

U.S. PATENT DOCUMENTS

| | | |
|---|---|---|
| 6,542,631 B1 | 4/2003 | Ishikawa |
| 6,574,364 B1 | 6/2003 | Economidis et al. |
| 6,701,380 B2 | 3/2004 | Schneider et al. |
| 6,829,301 B1 | 12/2004 | Tinker et al. |
| 6,871,008 B1 | 3/2005 | Pintz et al. |
| 6,898,313 B2 | 5/2005 | Li et al. |
| 6,940,900 B2 | 9/2005 | Takamizawa |
| 7,006,700 B2 * | 2/2006 | Gilgen .................. 382/240 |
| 7,272,180 B2 * | 9/2007 | Dambrackas .......... 375/240.01 |
| 2003/0202594 A1 | 10/2003 | Lainema |
| 2004/0062305 A1 | 4/2004 | Dambrackas |
| 2005/0025248 A1 | 2/2005 | Johnson et al. |
| 2005/0135480 A1 | 6/2005 | Li et al. |
| 2005/0286790 A1 | 12/2005 | Gilgen |
| 2006/0120460 A1 | 6/2006 | Gilgen |
| 2006/0126718 A1 | 6/2006 | Dambrackas et al. |
| 2006/0126720 A1 | 6/2006 | Dambrackas |
| 2006/0126721 A1 | 6/2006 | Dambrackas |
| 2006/0126722 A1 | 6/2006 | Dambrackas |
| 2006/0126723 A1 | 6/2006 | Dambrackas |

FOREIGN PATENT DOCUMENTS

| | | |
|---|---|---|
| JP | 01-303988 | 12/1989 |
| JP | 08-033000 | 2/1996 |
| JP | 08-263262 | 10/1996 |
| JP | 11-308465 | 11/1999 |
| JP | 11-313213 | 11/1999 |
| JP | 2002-165105 | 6/2002 |
| WO | WO 02/062050 A2 | 8/2002 |

OTHER PUBLICATIONS

U.S. Appl. No. 10/260,534, filed Oct. 2002, Dambrackas, Wm. A.
PCT International Search Report for PCT/US05/17626, International filing date Jan. 3, 2006.
PCT International Search Report for PCT/US05/19256, International filing date Oct. 25, 2005.
Office Action Issued Mar. 7, 2006, in Corresponding Japanese Patent Application No. 2004-541433.
Office Action Issued Mar. 7, 2006, in Corresponding Japanese Patent Application No. 2006-024442.
Office Action Issued Mar. 7, 2006, in Corresponding Japanese Patent Application No. 2006-024443.
Office Action Issued Mar. 7, 2006, in Corresponding Japanese Patent Application No. 2006-024444.
Office Action Issued Jul. 11, 2006, in Corresponding Japanese Patent Application No. 2006-024444.
Office Action Issued Jul. 4, 2006, in Corresponding Japanese Patent Application No. 2006-024442.
Office Action Issued Jul. 4, 2006, in Corresponding Japanese Patent Application No. 2006-024443.
International Preliminary Examination Report in Corresponding PCT Application No. PCT/US2003/030650, mailed Aug. 25, 2006.
PCT International Search Report in corresponding PCT Application No. PCT/US2003/030650 mailed Apr. 20, 2006.
Office Action issued Jul. 31, 2007 in corresponding Japanese Patent Application No. 2006-024444 (with English translation).

* cited by examiner

VIDEO COMPRESSION NOISE IMMUNITY

CROSS-REFERENCES TO RELATED APPLICATIONS

This application relates to U.S. patent application Ser. No. 10/260,534, Dambrackas, "Video Compression System" filed on Oct. 1, 2002 (the "Dambrackas Application"), the entire contents of which are incorporated herein by reference.

FIELD OF THE INVENTION

This invention relates to digital video and more particularly to video compression noise immunity.

BACKGROUND AND SUMMARY OF THE INVENTION

Run length encoding schemes for compressing digital video streams are a known method of reducing the bandwidth required to transmit video over a transmission medium. In run-length encoding, pixels of a certain color value are transmitted by identifying a copy command rather than the actual pixel color itself. Ideally, with run-length encoding, multiple consecutive pixels of a common color can be defined by one (or a few) commands indicating, essentially, that a run of X length of common pixel colors can be drawn using a known color as the copy standard. Thus, rather than sending a stream of information identifying independent colors of consecutive pixels, the encoder issues a command to draw X number of pixels of a previously identified pixel color.

The difference in the amount of bandwidth required between individual pixel identification and run length encoding can be substantial, especially in the computer arts, where long lengths of pixels are the same color (for example, background). As described in the Dambrackas Application, several different ways of run length encoding can be envisioned, such as copying a run from a pixel to the left of the run, copying a run from a pixel in a previous frame, copying a run from a pixel above the first pixel in the run, or other such methods.

The present invention can be employed in any kind of run length encoding scheme, including for example, the run length encoding scheme of the Dambrackas application.

As those of ordinary skill in the art will understand, pixel colors are represented by a color space, typically an RGB color space so that any particular color in a color palette can be represented by a value of red, combined with a value of blue, combined with a value of green. The number of bits available for each one of the color components (R, G, and B) will define the depth or richness of the color palette. The present invention is not limited in any way to the number of bits provided by the particular color palette, but for simplicity and purposes of explanation only, the present invention will be described with respect to an eight bit per color RGB color space.

In FIG. 1, this eight bit per component color scheme is shown as orthogonal definitions of a 8×8×8 RGB color matrix. Every color in the color palette can be defined by a location within the orthogonal projections as (1) a value for R between 0x00 and 0xFF, (2) a value of G between 0x00 and 0xFF, and (3) a value of B between 0x00 and 0xFF. In uncompressed digital video, each pixel is defined by its unique 8×8×8 orthogonal location. Because screens of information can include millions of pixels, such video schemes require huge bandwidths for communication.

Thus, for the scan line of pixels shown in FIG. 3, the prior art of FIG. 4 attempts to identify each individual pixel color C1, C2, C3, etc. as individual triplets of bytes of the pixel information shown in FIG. 1. That is, in FIG. 4, the pixel color C1 is identified as an independent triplet of bytes with a header H, an eight-bit R component ($R_{ox}$), an eight-bit green component ($G_{ox}$), and an eight-bit blue component ($B_{ox}$), effectively identifying a single color in the 8×8×8 matrix of FIG. 1. The next triplet of bytes following the C1 triplet is the C2 triplet independently identifying the pixel color C2 in a manner similar to that shown in C1. Similarly, subsequent pixel colors C3, C4, etc. are identified by their own independent triplets of bytes. As one can see in FIG. 4, the pixel scan line of FIG. 3 is being identified by a stream of bytes that are uncompressed. With potentially millions of pixels per monitor screen and rapid refresh rates, the number of bytes required to employ the uncompressed video of FIG. 4 makes it essentially unworkable.

Known run length encoding, which compresses the video of FIG. 4 into a fewer number of bytes, is shown in FIG. 5. In this example, suppose that C1-C7 are the same color (for example in a background scan portion). In the example of FIG. 5, the first pixel color C1 in the scan line of FIG. 3 is encoded as an independent triplet of bytes (for each of the R, G, and B components), just like it was in the uncompressed video of FIG. 4. The C1 color, that is now known to the decoder at the monitor end, then becomes a standard by which the next six subsequent pixel colors C2-C7 (which in this example are the same color as C1) are identified by a single RLE (run length encoding) byte comprised of a header, a copy left (CL) command, and a payload identifying the run length of six pixels. The encoding of FIG. 5 communicates all the information needed to transmit the exact seven colors in the scan line of FIG. 3 with a first triplet of bytes followed by a single RLE byte, where the embodiment of FIG. 4 required seven triplets of bytes.

The embodiment of FIG. 5 works very well as long as the color encoder is able to identify long runs of exact match colors. Thus, in the example described above with respect to FIG. 5, the colors C1-C7 were assumed to be identical. A problem occurs, however, when the colors C1-C7 are identical in fact, but the encoder does not recognize them as identical. Such mistaken identity of colors usually occurs due to noise intrusion. Thus, if the encoder recognizes C2, C4 and C6 as even minutely different colors as C1, C3 and C5, the run length encoding will be thwarted because the encoder will not recognize the C1-C7 scan portion as a true run of identical colors. This can occur even when the encoder inaccurately perceives C2, C4 and C6 as neighbors to C1, C3 and C5 in orthogonal location (FIG. 1).

The present invention liberalizes the identification of matches among consecutive pixels so run lengths of matching colors will not be interrupted by certain noise conditions.

DETAILED DESCRIPTION OF THE PRESENTLY PREFERRED EMBODIMENT

Image compression algorithms, such as the algorithms described in the Dambrackas application, exist to allow the information in an image to be represented in as few bytes as possible. Compression, however, does not come for free. Generally, the more efficient a compression algorithm is in representing the image in a small number of bytes, the more costly it is computationally. This means either more or faster hardware is needed to perform the computations, or more time is needed to process the image.

The information contained within the image that is to be represented by compression resides in the spatial placement of color data. In other words, in general, one can not separate the spatial information from the color information. Any attempt to do so either creates or destroys information from the original image.

Compression algorithms fall into two categories: lossy and loss-less. Loss-less compression algorithms preserve all spatial and color information in an image. They tend to require much more processing capability, and compress less efficiently than the lossy algorithms, however, the original image can be faithfully reproduced from the compressed data. Lossy compression algorithms enhance compression but do so at the expense of retention and fidelity of the spatial color information.

For purposes of the example described herein, an incoming pixel is assumed to be represented by three analog signals representing the R, G, and B color components of the pixel. Thus, in FIG. 6, the analog video signal 60 is received from any kind of analog video source as traditional red, green and blue color components. Of course, other color schemes are common and can be used in the present context in lieu of RGB schemes.

In addition to carrying the video information, each of the RGB color components in analog video signal 60 will also carry unwanted noise. There are a number of ways in which noise may be introduced into the analog video signals 60, and the exact noise types are neither important to—nor constraining on—the present invention. For purposes of this description, we assume that any noise discussed is additive noise which is not correlated with any data represented by the video signals, and is independent of any noise appearing on any other pixel or color component.

Figure 1:
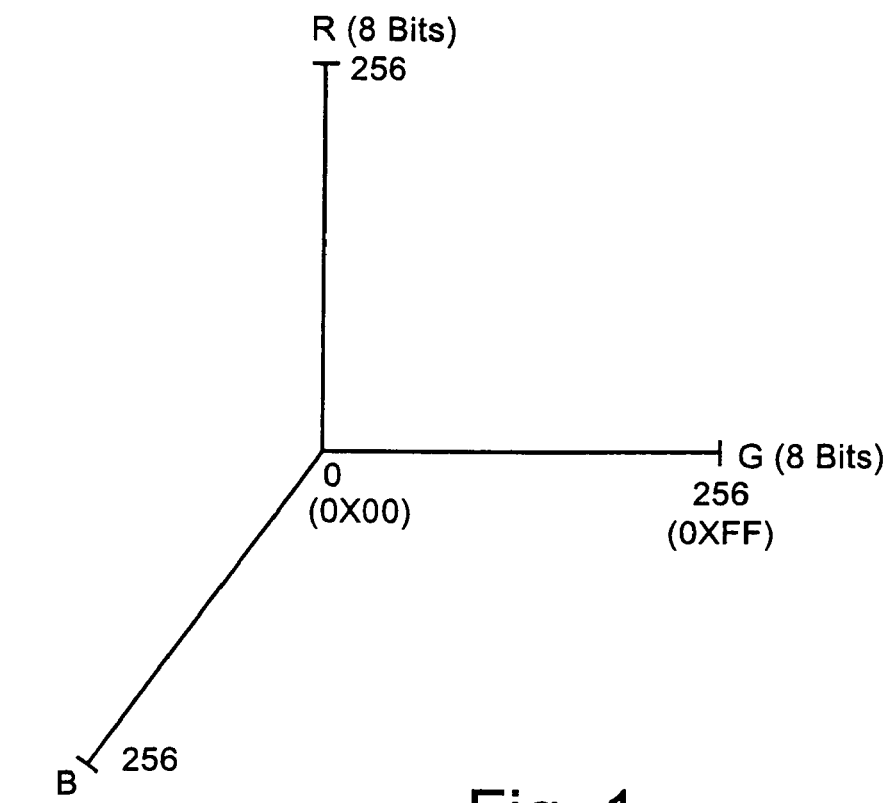
FIG. 1 is a graphical representation of conventional eight bit RGB color palette.

As shown in FIG. 1, a pixel's three color components can be thought of as coordinates in a three-dimensional color space, where the red, green and blue components form orthogonal axes. Color components from computer video sources typically get digitized into eight bits, resulting in 256 possible levels for each of the three color components. Of course, as described previously, the present invention is not limited to any particular number of bits or any particular color scheme (such as RGB) but has application wherever pixel encoding requires comparative analysis. The example of FIG. 1 illustrates a possible color space that contains over 16 million unique colors, and is often referred to as 24 bit color.

Figure 2:
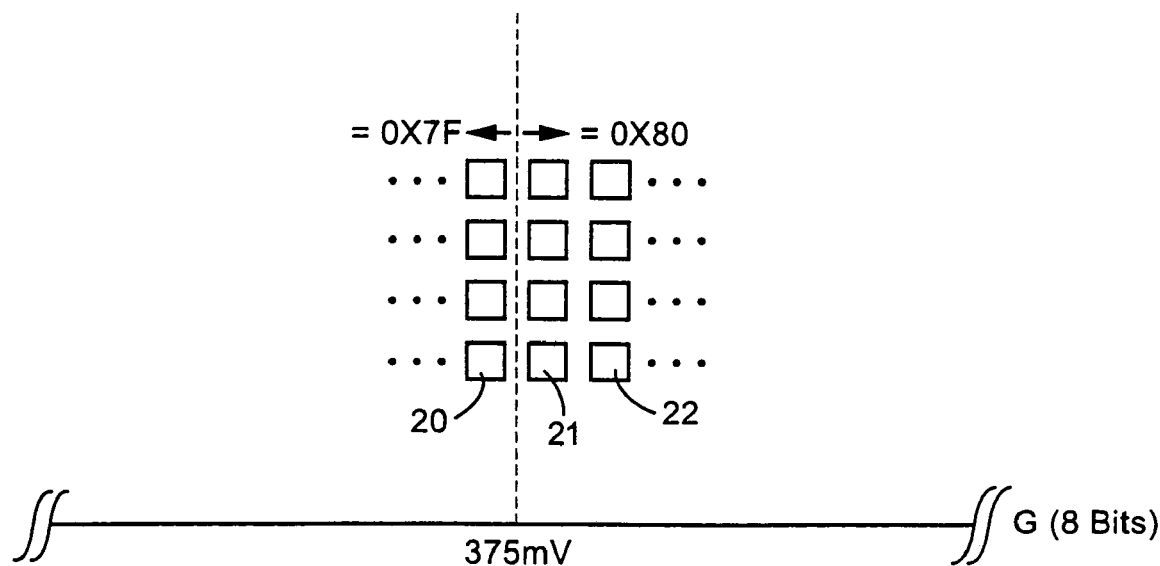
FIG. 2 is a graphical representation of transitions in an example color palette.

FIG. 2 is a two dimensional representation of a portion of FIG. 1 corresponding to just the R-G plane. In FIG. 2, very few of the colors defined by the R-G plane are shown for the purpose of illustrating one example context in which the present invention can improve compression. In the matrix of colors of FIG. 2, colors of increasing green value proceed to the right and colors of increasing red value proceed upwardly. The following description applies with respect to each of the color components, but for purposes of explanation, only the green component will be used to describe this system.

In FIG. 2, the green value between 0x00 and 0xFF (256 different color values) are defined by the hexadecimal representation corresponding to the green intensity. For example, a typical video signal may reflect an intensity of the green component that varies over a range from 0 mV to 700 mV. When that signal is digitized to eight green bits, the voltage variations are resolved in steps of 2.75 mV. Thus, if the green component is exactly 0 mV, it will be encoded as 0x00, and if the green component is exactly 2.75 mV, then it will be encoded as 0x01. In the case when the green component is exactly 1.375 mV, the smallest amount of noise will push the green color component closer to 0V or closer to 2.75 mV (depending on whether the noise is additive positively or negatively), resulting in a chance that the pixel will be encoded as either 0x00 or 0x01. Thus, for component values at transition locations, noise in the signal can have an impact on the actual color value selected.

Of course, with 256 possible green intensity values and in the context of, specifically, computer video, to the user looking at a particular pixel, a portion of which is the 1.375 mV green component, the difference between a 0x00 or 0x01 encoding may not make a significant difference in the perceived video presentation. Thus, in most computer contexts the problem of noise at the transitions between color values is not a problem of video perception per se, but may be a problem in the context of moving or still photograph video where slight changes in color are important to the user's shade perception. In the computer arts, while slight color variation may not on first blush appear critical, they become a real problem in the context of optimizing run length encoding of the computer video.

Figure 3:
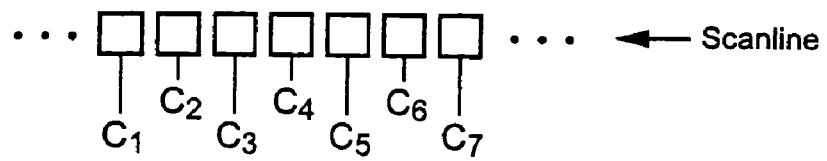
FIG. 3 is a graphical representation of a scan line of pixel colors being output by a video source.
Figure 4:
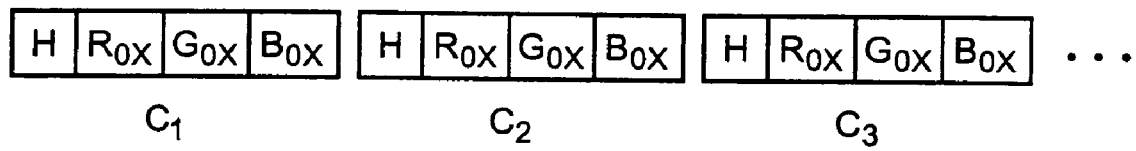
FIG. 4 is a conventional uncompressed video packetization of the scan line of FIG. 3.
Figure 5:
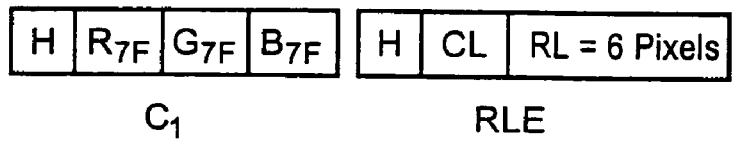
FIG. 5 is a conventional run length encoding example of a scan line of FIG. 3.

This can be seen in the examples of FIGS. 3-5. In situations where the encoder is determining whether a scan line, such as FIG. 3, includes a run of matched color values, if one of the colors C1-C7 is misperceived as a non-matching color, solely as a result of noise, the run will be ended and the encoding compression will suffer. Consider for example, the embodiment of FIG. 2 in which the green component is 350 mV. This value is at the transition between color 20 and color 21 such that the smallest amount of noise decreasing analog intensity will encode the color as element 20 (0x7F) and the smallest amount of noise increasing color intensity will encode the color as element 21 (0x80). In other words, the smallest amount of noise driving the signal downwards results in the signal being encoded as 0x7F and any noise forcing the signal upward will result in the signal being encoded as 0x80. In this example, the problem is particularly acute because the smallest amount of noise can make all of the bits in the digitized version change (0x7F versus 0x80).

The illustration of FIGS. 2 and 3 is somewhat simplified, but it illustrates the general principle that if we require exact matches between pixel values in determining run lengths, compression efficiency will suffer.

Another illustrative example of noise-induced inefficiency occurs when run length encoding is augmented by palette encoding. One method of compressing video is to reduce the number of bytes needed to transmit a color image by reducing the number of bits used to represent the color of a pixel. In the extreme case, each pixel could be represented as a single bit, resulting in a compression ratio of 24:1. This extreme color compression requires that half of the RGB colors get mapped to a 1 and the others get mapped to a 0. We do this by dividing our three dimensional color space of FIG. 1 into two distinct regions. A pixel which is mapped to one of these regions gets represented by a 1 and a pixel which gets mapped to the other region gets mapped to a 0. As an example, define a 1 as all pixels whose components sum is greater than 384, that is, the output from our color space compression will be $$Y = \begin{matrix} 0 & \text{if } R+G+B <= 384 \\ 1 & \text{if } R+G+B > 384 \end{matrix}$$

where Y is the resulting 1 bit color value of the pixel, R is the red color component of the incoming pixel, G is the green color component of the incoming pixel, and B is the blue color component of the incoming pixel.

That color space conversion then gets interesting when noise is added to the system. In the three dimensional color space, addition of a small amount of noise to a single color component has only a small overall effect. Unfortunately, when the color space is reduced by mapping to new color values, the effect of a small amount of noise can be quite large. For example, if our incoming pixel color is (R,G,B)= (128,128,128) then its displayed color will be a mid level gray. When we compress this color using the function above, the sum of its components is 128+128+128=384, resulting in a compressed pixel value Y=0. If we add a noise value of 1 to only the red component of the nominal pixel value, we get (129,128,128). The sum of the noisy pixel's components is 129+128+128=385, resulting in a compressed pixel value of Y=1. The small noise tipped the color value from Y=0 to Y=1. A small amount of noise added to the incoming pixel can have a tremendous effect on the resulting color-compressed value.

As it turns out, many areas of the computer video arts are unique compared to the picture video arts because of the high contrast that usually occurs between adjacent pixels and the relatively few colors that are employed. In most computer video the primary interest is compressing images which are computer-generated desktop and windows applications.

The limited number of colors and limited need to handle moving video can be put to good use when designing a compression algorithm. Because of these characteristics, in the above example, the Y=0 and Y=1 change of pixel value may not materially affect the picture when it occurs in the computer arts. After all, Y=0 and Y=1 are nearly equally valid representations for a pixel value which lies on the boundary between the two regions. To take advantage of the high contrast of the information presented in typical screens, one can ignore small variations in color value of nearby pixels and generally lose little if any important information contained in the image. Ignoring any small color value changes over small spatial separations helps to compress data more efficiently, and may also help avoid transmitting noise information.

Because most of the information of interest within an incoming image lies in high contrast between neighboring pixels, small color changes between adjacent pixels can be ignored under the assumption that these small changes are artifacts of additive noise. One can then purposely bias the "measurement" of any pixel's color value based on the color value of that pixel's neighbors. In this example, the result is, in effect a type of spatial filtering, but not linear spatial filtering, which may risk either amplifying the effects of noise or losing high-contrast image information. Rather, in this example, the effect is dependent upon the amplitude of the change in color between adjacent pixels. That means reducing the low-amplitude noise-induced variations, while preserving the large-amplitude image content.

That spatial filtering can come into efficient use in any analytical encoder in which comparative analysis is performed between pixel values. In one example of such an application, the spatial filtering is applied to run-length encoding schemes. Most compression algorithms make use of the general similarity of nearby pixels in order to reduce the number of bytes needed to encode any particular pixel. For example, as introduced previously with respect to FIG. 5, in run length encoding (RLE), pixels are encoded by a color value and a run length, which indicates the number of subsequent pixels which have the same color value. As soon as the encoding algorithm detects a pixel with a different value, the run ends, and a new run begins.

The weakness of these types of algorithms is that any difference (such as that caused by noise) between a pixel and the pixel to which it is compared (the standard) can result in a mismatch being detected, and the run being prematurely terminated. Spatial filtering employing color space hysteresis relaxes the requirement that a pixel exactly match the color value of a run, so that a pixel value only needs to be within a threshold value to the run value to be regarded as a match.

In RLE, after using color space conversion to reduce the number of colors to be represented in the compressed image, the first pixel which the compression algorithm processes will set the color value of the first run. Then, taking the 24 bit color value of the pixel, determining the region in the color space into which that color value falls, and replacing the value with the 24 bit color of that region, yields a basis for the run. When the next pixel is measured, if its color value maps to the same region in the color space, then the run continues. However, if the "true" color of the next pixel (the color value prior to being corrupted with noise) is near the edge of the color space region, then noise can easily push that color value into an adjacent color spatial region.

So instead of comparing the new pixel to see if the new pixel falls into the region which forms the basis for a run in the color space map, the run's color region is replaced with one which is slightly expanded in all three color dimensions. The slightly expanded color region is larger in 3-D space than the true pixel color, but operates as a test region which can be used to test whether the encoder will treat the measured value as in fact within the true color space. If the pixel falls into the test region, then the run continues; if not, the run terminates and the new pixel forms the basis of a new run. This larger test region now prevents pixels which have been corrupted by small amounts of noise from being pushed out of the run's region, thus preserving longer runs that would otherwise be interrupted by noise. Larger color changes such as those expected from non-noise information within the input image will not be filtered and will thus terminate runs for screen areas of high pixel contrast.

Figure 11A:
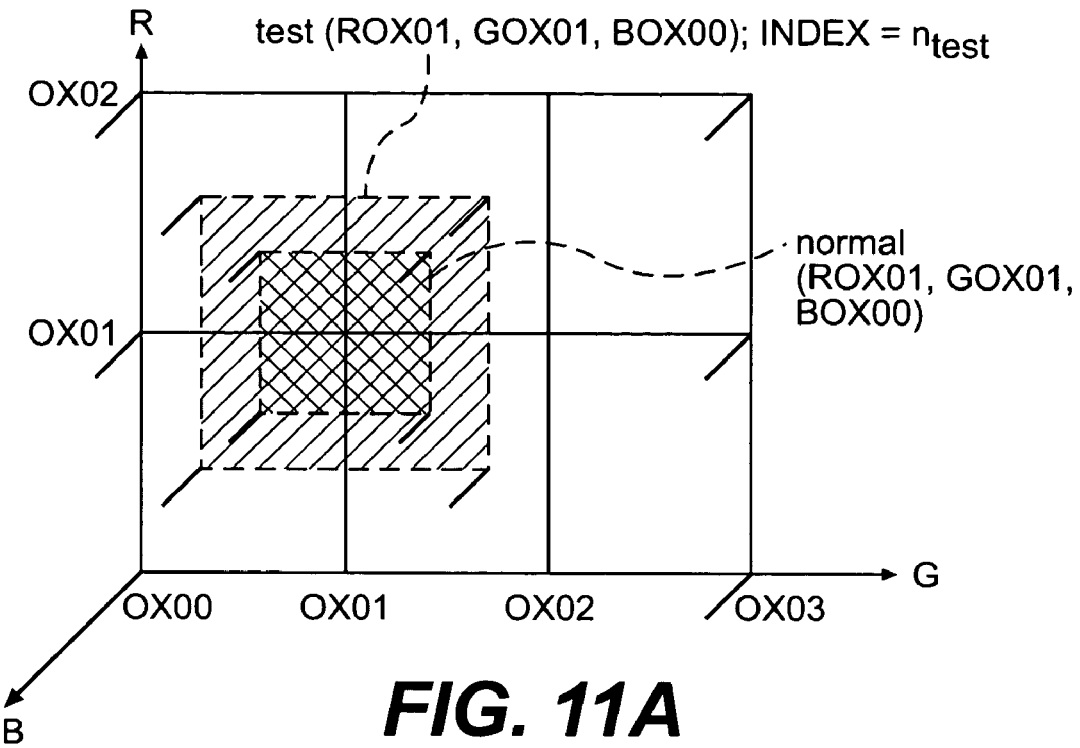
FIG. 11 is a graphical representation of RGB hysteresis according to an example aspect of the invention.

Color space hysteresis is most simply implemented when the color space is divided into regular cubical regions as shown in FIG. 11A. To appreciate this figure, take as an example a simple RLE run, where the actual run color value is at the geometric center of cubical regions normal (R0x01, G0x01,B0x00), the normal color space region, and test (R0x01,G0x01,B0x00), the slightly expanded color region. A new pixel value which falls within region normal (R0x01, G0x01,B0x00) corresponds to the actual run color value represented in three dimensions. A new pixel of the same color, but which has been noise-corrupted and therefore pushed outside of the normal color space region normal(R0x01, G0x01,B0x00), would nonetheless fall within the expanded test region test(R0x01,G0x01,B0x00). This relaxed spatial requirement allows such a pixel to still correspond to the actual run color value, and prevents interruption of the current run.

Figure 11B:
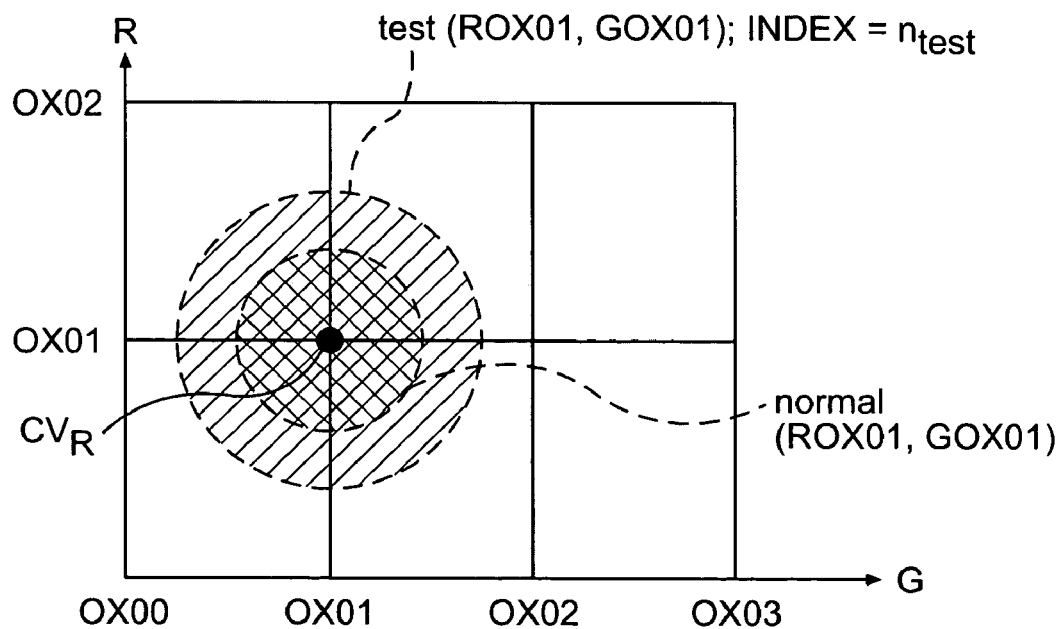

The regions need not be cubical. FIG. 11B shows a configuration of circular regions having an actual color value of $CV_R$, where normal(R0x01,G0x01) represents the normal color space region and test(R0x01,G0x01) represents the expanded test region. As shown, the blue bits can be completely dropped from the hysteresis to reduce the algorithm complexity.

Although each of the color components appear in two-bit form in FIGS. 11A and 11B, these components can have larger bit size allocations such as five bits or eight bits, for purposes of higher resolution. Also, a region need not be limited in size to the digital-value limits shown on the axes of FIGS. 11A and 11B, as it may be sized to cover larger dimensions.

A single number $n_{test}$ can be used to describe the "expansion" of the region (test (R0x01, G0x01, B0x00)) for the purpose of implementing hysteresis, or a different value of $n_{test}$ can be used for each color axis. In the latter case, hysteresis can be customized in the R, G, and B axes, respectively to accommodate different levels of sensitivity for the different components. In such a case, the hysteresis block and the actual color block of FIG. 11 would not be cubical or circular, but could form any variety of shape depending upon the bits from the color components and the $n_{test}$ values chosen for each component axis.

Although not shown in FIG. 11A, each of the cubes defining an RGB pixel color will receive similar $n_{test}$ hysteresis expansions so that adjacent cubes actually overlap in ascertainable value compared to adjacent color cubes. The actual value of hysteresis employed can vary depending on levels of sensitivity desired in video perception and richness of color, versus the opportunity to enhance compression by recognition of greater run length. As described above, the actual value can also depend upon the color axis, to create other than cubical hysteresis.

The present invention can be embodied with respect to any kind of encoding that compares pixels for commonality, such as run length encoding, and is not limited to any particular kind of run length encoding. Solely for brevity and purposes of illustrating an example of the present invention, one embodiment will be described with respect to a scan line shown in FIG. 3 and a run length encoding in which a run length of pixel colors C2-C7 are encoded based on a copy left (CL) command from the standard color C1. Examples of how such run length encoding can be accomplished within the context of computer monitors and computer networks is described in the Dambrackas application.

The Dambrackas application describes five different types of commands to encode a series of pixels. The first three are run-length encoding commands and include: (1) the copy-left command (encoding a run-length of pixel values based on a pixel value to the immediate left of the run), (2) the copy-old command (encoding a run-length of pixel values based on a pixel value in the same location as the first pixel in the run but in the immediately preceding frame), and (3) the copy-above command (encoding a run-length of pixel values based on a pixel value immediately above the first pixel in the run). Hysteresis provides advantage in the context of all of those run-length encoding techniques.

The hysteresis method also provides advantage in the context of the fourth encoding command described in the Dambrackas application, the so-called make-series command. The make-series command is also a comparative analysis command because it uses as standards two different current pixel color values and encodes by binary ones and zeros a subsequent set of pixels that fall within one of the two color standards. The command is effective for text encoding that comprises a string of 2-color (text and background) runs. Hysteresis provides advantage both (1) for the comparison of the two different color standards (to decide whether they are, in fact, high enough in contrast to be considered two different colors), and (2) for the comparison of subsequent pixels to determine whether they match one of the two color standards. Of course, the hysteresis values for the "two-color difference" determination can be the same or different in sensitivity (thresholds) than the "color match" determinations.

Figure 6:
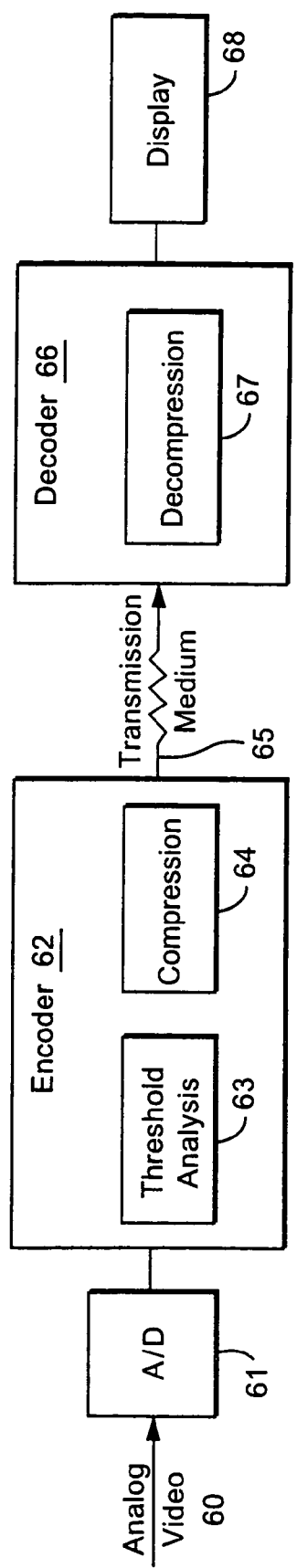
FIG. 6 is a system according to an example embodiment of the present invention.

FIG. 6 illustrates an example system that includes hysteresis to ease the requirement for exact matches in calculating run length and other comparative conditions. Analog video signal 60 is input to analog digital converter 61 which it is digitized into a stream of digital video signals for the encoder 62. The encoder 62 may be an encoder such as that described in the Dambrackas application or any other similar kind of comparative analysis encoder. Within the encoder 62 is a threshold analysis routine 63, which run a threshold routine described below. Also included within encoder 62 is the compression routine 64, which provides the run length encoding of the digital video stream received from the A to D converter 61. Transmission medium 65 communicates the encoded video from the encoder 62 to the decoder 66 where decompression routine 67 reverses the process of the compression routine 64 to retrieve the digital video stream. The decompressed digital video stream is directed to a display 68, such as a flat panel display or in an alternative embodiment (after being passed through a D to A converter) to an analog video monitor.

The specific application of the system of FIG. 6 can vary. For example, the system could be a video extender for a remote PC. It may also be employed in video communication on network systems, remote PC controllers, KVM switch applications, or any other application in which digital video is encoded by run length encoding or other encoding which analyzes for match or mis-match conditions. Further, the routines involved in compression (64) and threshold analysis (63) can be in a single processor, ASIC, FPGA or other suitable device to perform the kinds of routines described in, for example, the several embodiments of FIGS. 7-10, or in still other alternative embodiments.

In an example embodiment of the present invention, instead of requiring an exact match for a run length condition to apply, the threshold routine 63 subtracts one pixel value from another pixel value, and compares the absolute value of the result to a threshold value. If the absolute value of the difference is less than or equal to the threshold, then it is treated as if it were an exact match. Specifically, a current pixel's red, green, and blue components $R_i$, $G_i$, $B_i$ are identified as an incoming pixel value in a stream of video received by the encoder 62 from the converter 61. The encoder 62 also identifies $R_s$, $G_s$, $B_s$ as a known pixel value (a standard) either in the present frame or a prior frame. Once the encoder 62 knows the value of $R_i$, $G_i$, $B_i$ and $R_s$, $G_s$, $B_s$, the encoder 62 attempts to determine whether a match condition exists between the two. As previously described, in prior systems, the encoder 62 would determine whether the value of $R_i$, $G_i$, $B_i$ was the same as $R_s$, $B_s$, $G_s$, to determine identity. As described with respect to FIG. 2, in some instances, that identity may fail as a result of mismatch identifications that don't really exist.

Accordingly, in the example embodiment, the encoder 62 subtracts the value of $R_s$, $G_s$ and $B_s$ components from the values of $R_i$, $G_i$, $B_i$ components in order to obtain difference signals $R_d$, $G_d$, $B_d$. The absolute values of $R_d$ $G_d$ and $B_d$ are analyzed to determine whether they are less than a threshold value of $C_{thresh}$. If so, the run length is incremented at step 79 and a new $R_i$, $G_i$, $B_i$ is identified. In other words, if the difference values $R_d$, $G_d$ and $B_d$ are less than the threshold, the match condition is assumed to be the case, and the run length is not interrupted.

When $R_d$, $G_d$ or $B_d$ exceed the threshold, the encoder 62 first determines whether any run length is currently in process. If so, that run length is ended and encoded by the compression routine 64, and a new $R_i$, $G_i$ and $B_i$, is identified. If, on the other hand, no prior run length has been identified (prior to the current $R_i$, $G_i$ and $B_i$ presently being analyzed) then $R_i$, $G_i$ and $B_i$ are encoded according to some other encoding arrangement other than run length encoding by the compression routine 64. Again, another $R_i$, $G_i$ and $B_i$ is then identified.

Some examples will now be described to explain the impact of the compression. The examples are described in the context of the copy-old commands (CO), copy-left commands (CL), copy-above commands (CA), and make-series commands (MS) previously introduced.

Figure 7:
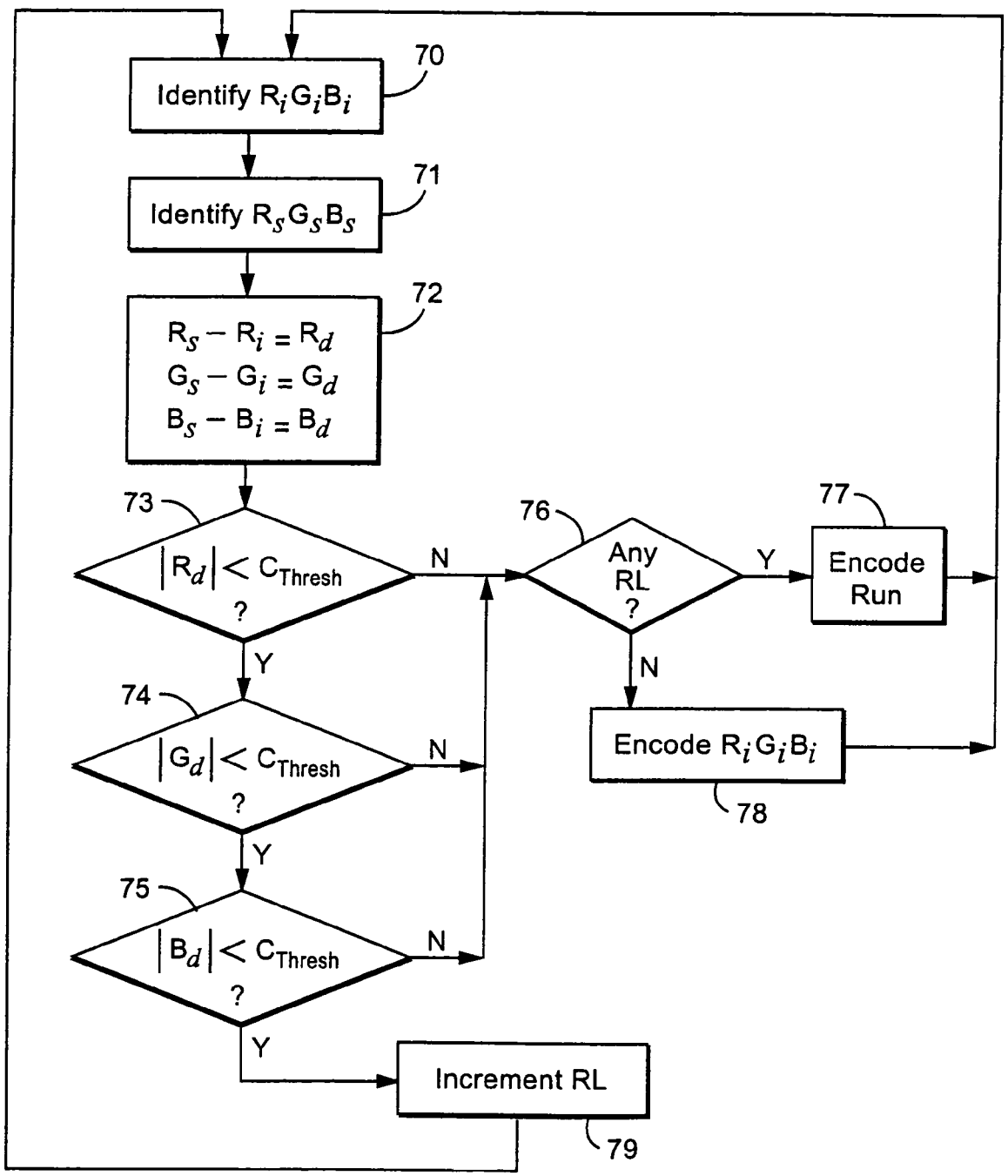
FIG. 7 is a flow diagram of an example method according to the present invention.

First, a method of incrementing the count of a CO command (FIG. 7) is described. Recall that the copy-old command is a run length command in which the present pixel value is compared to the pixel value in a prior frame corresponding to the location of the first pixel in the present pixel run. In FIG. 7, an incoming pixel value is identified by encoder 62 as $R_i$, $G_i$ and $B_i$ at step 70. The previously sent value for the copy old pixel location (that is, the value currently displayed by the client) is identified by encoder 62 as $R_s$, $G_s$ and $B_s$ at step 71. $C_{thresh}$ is the assigned color component threshold. Then, $Rd=R_s-R_i$, $G_d=G_s-G_i$, $B_d=B_s-B_i$ (where $R_d$, $G_d$, and $B_d$ are the color component differences) is calculated at step 72. If $|Rd|<C_{thresh}$ and $|Gd|<C_{thresh}$ and $|Bd|<C_{thresh}$ at steps 73-75, then the incoming pixel value matches the previously sent value, and the CO count is incremented at step 79. If the match fails at any of steps 73-75, then the CO command is terminated. Thereafter, if a run existed prior to $R_i$ $G_i$ $B_i$, but is now ending due to the current mismatch (step 76), the run is encoded at step 77. If not, the pixel $R_i$ $G_i$ $B_i$ is encoded using a method other than RLE at step 78.

Figure 8:
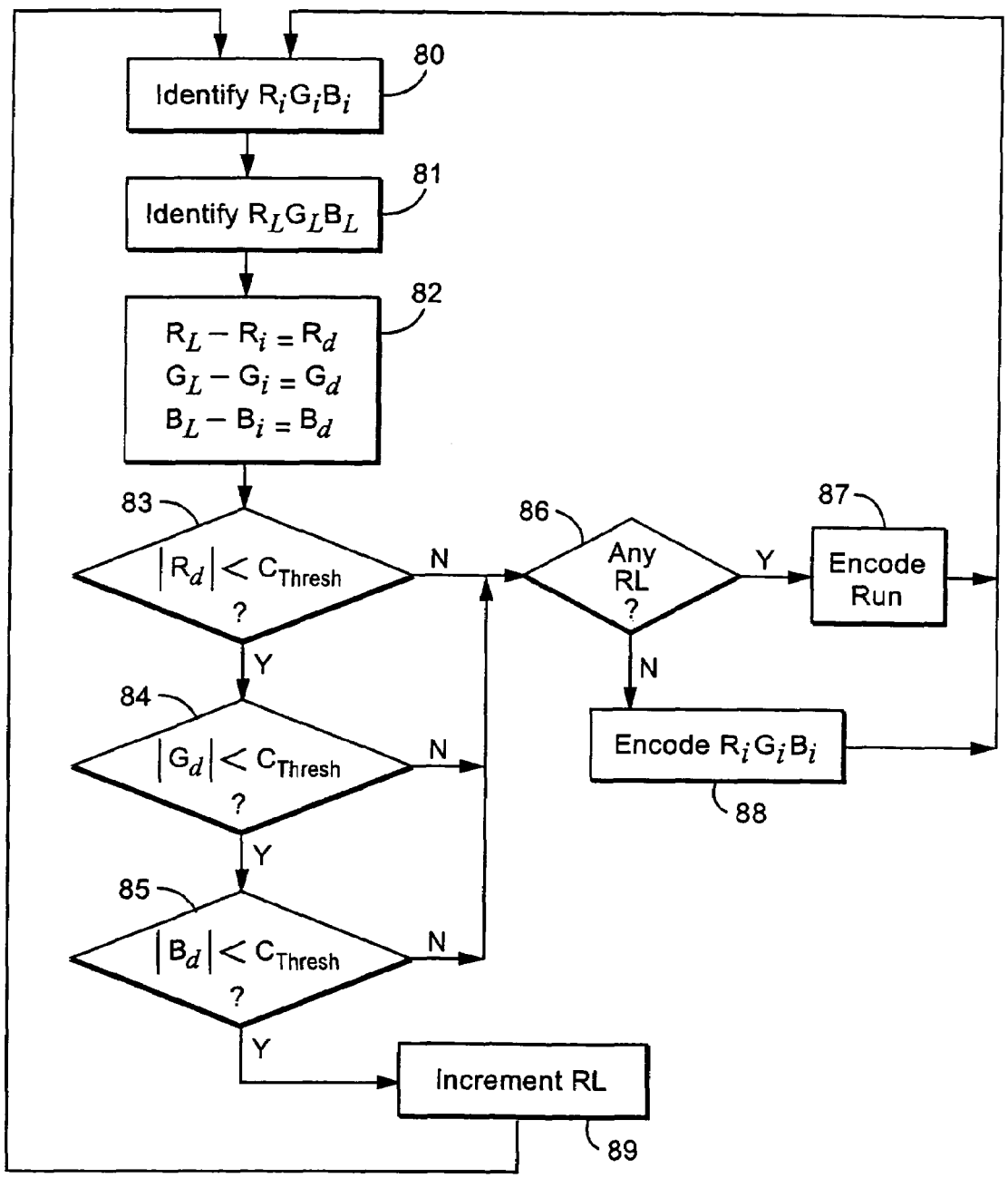
FIG. 8 is a flow diagram according to another example method.

Next, a method of incrementing the count of a CL command (FIG. 8) is described. Recall that a copy-left command is a run length encoding command in which the present pixel value is compared to a prior pixel value immediately to the left of the first pixel in the present run. In FIG. 8, incoming pixel value is identified by encoder 62 as $R_i$, $G_i$, $B_i$, at step 80. The value of the pixel sent prior to the start of the CL command is $R_L$, $G_L$, $B_L$ at step 81, and $C_{thresh}$ is the assigned color component threshold. Then, $Rd=R_L-Ri$, $G_d=G_L-G_i$, $B_d=B_L-B_i$, (where $R_d$, $G_d$, and $B_d$ are the color component differences) is calculated at step 82. If $|Rd|<C_{thresh}$ and $|Gd|<C_{thresh}$ and $|Bd|<C_{thresh}$ at steps 83-85, then the incoming pixel value matches the previously sent value, and the CL count is incremented at step 89. If the match fails at any of steps 83-85, then the CL command is terminated. Thereafter, if a run existed prior to $R_i$ $G_i$ $B_i$ but is now ending due to the current mismatch (step 86), the run is encoded at step 87. If not, the pixel $R_i$ $G_i$ $B_i$ is encoded using a method other than run-length encoding at step 88.

Figure 9:
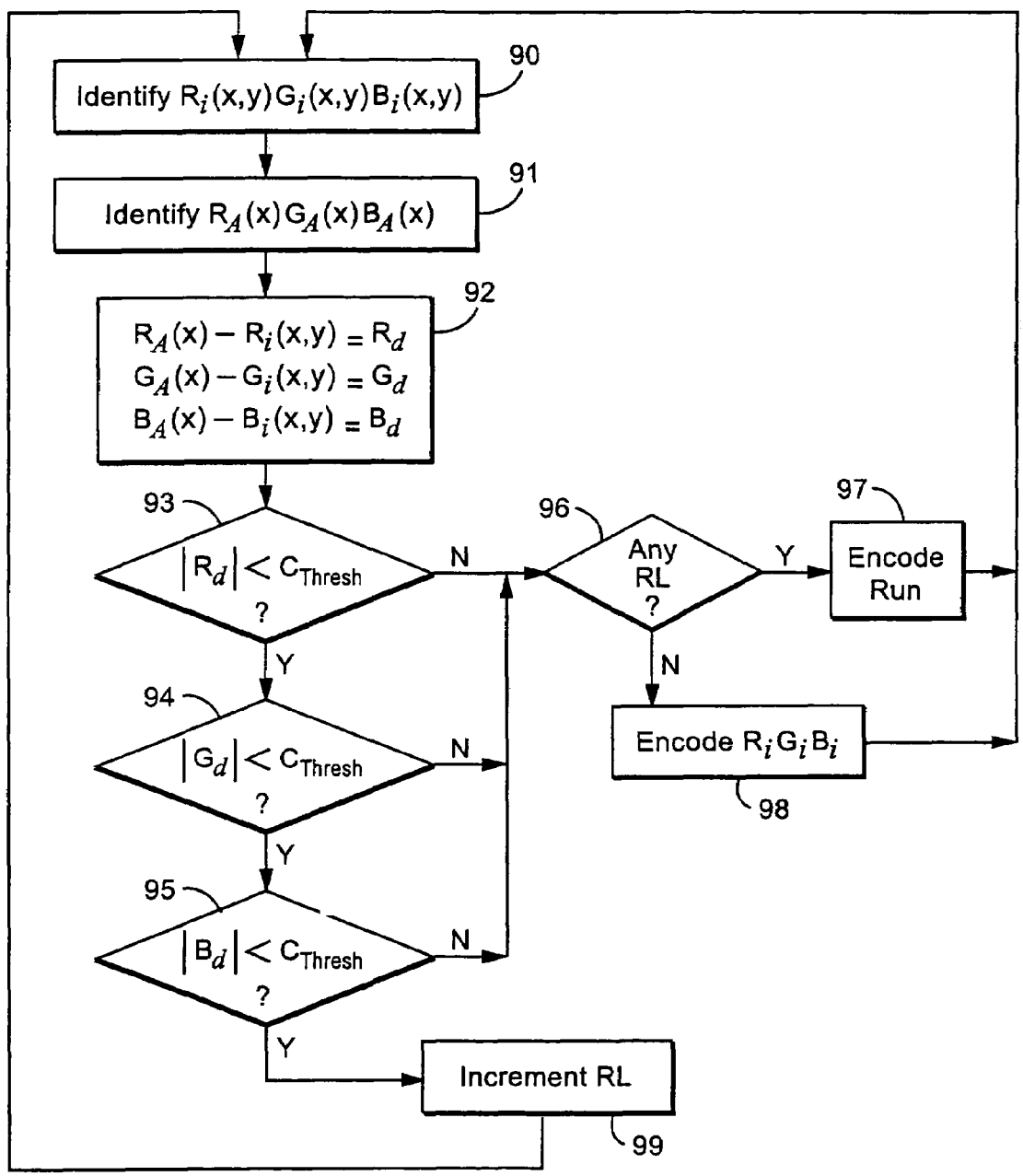
FIG. 9 is a flow diagram according to another example method.
Figure 10A:
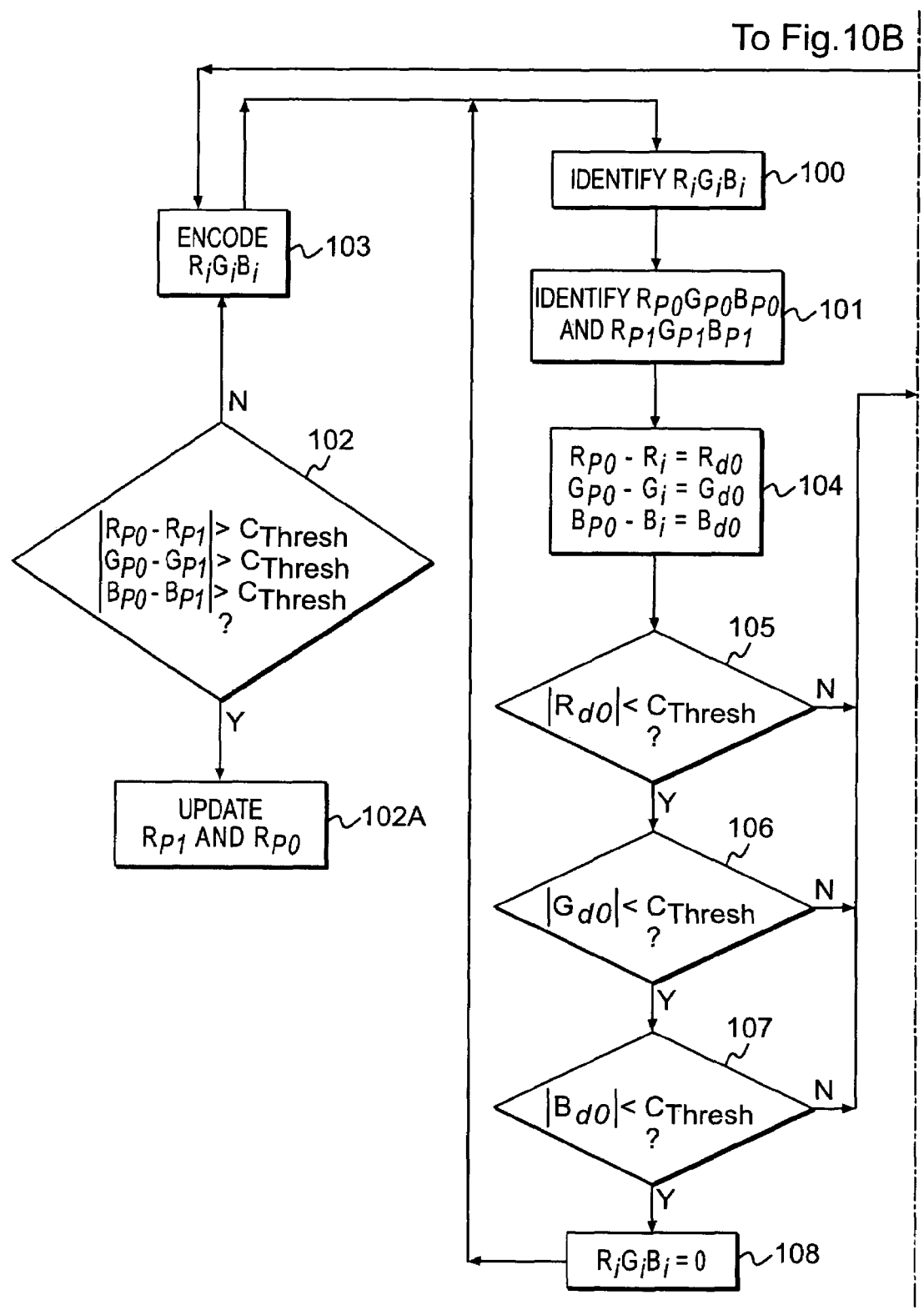
FIG. 10A-B is a flow diagram according to another example method.
Figure 10B:
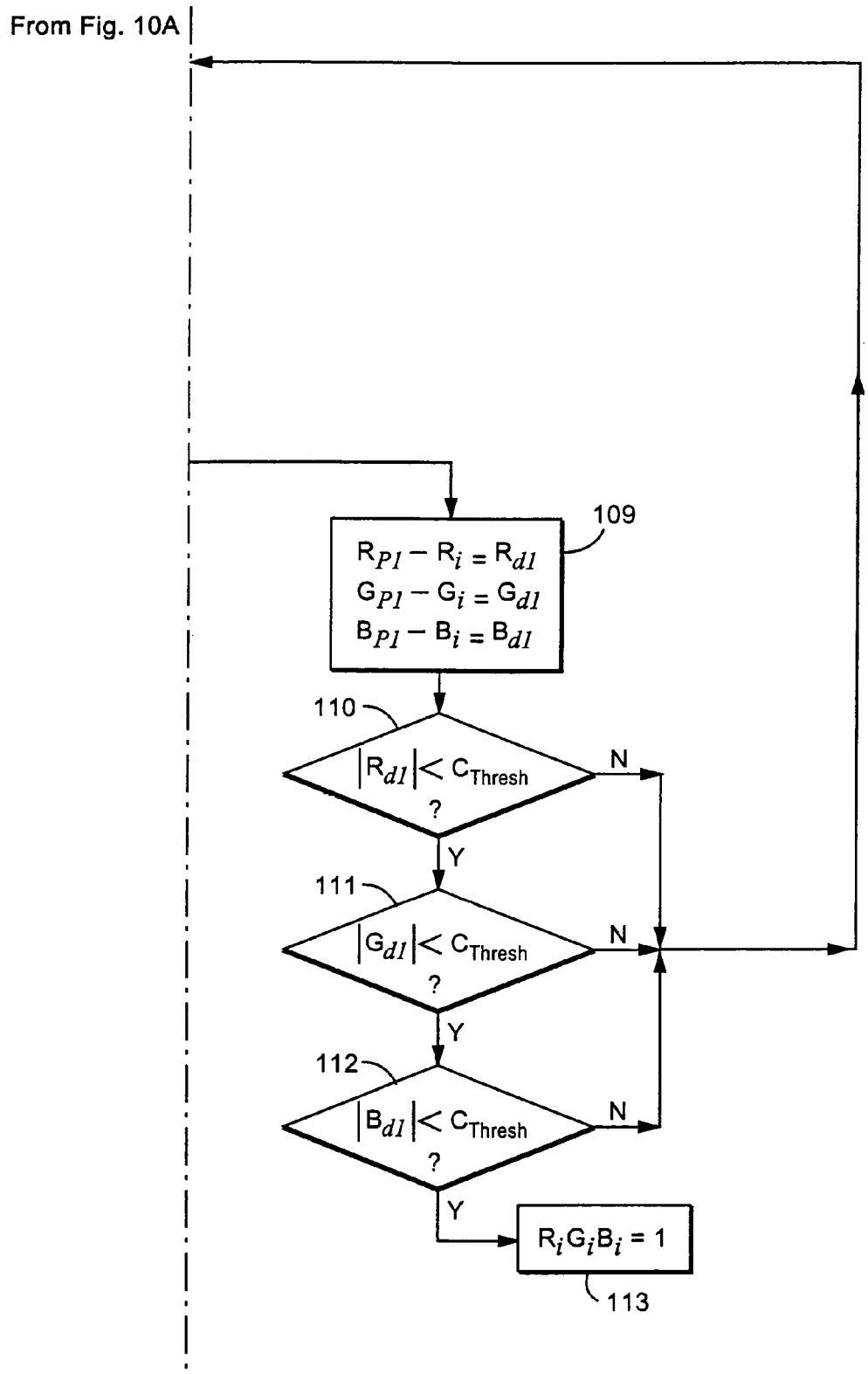

Next a method of incrementing the count of a CA command (FIG. 9) is described. Recall that the copy-above command is a command in which the present pixel value is compared to a pixel value immediately above the first pixel in a present run. In FIG. 9, prior to starting a CA command, a list of color values must be stored which corresponds to the last color values sent for each pixel column position within the image (i.e., one previous row). The values contained in this array will not change during execution of the CA command. An incoming pixel value is identified by encoder 62 as $R_i(x,y)$, $G_i(x,y)$, $B_i(x,y)$ at step 90. The value of the corresponding array entry is identified as $R_A(x)$, $G_A(X)$, $B_A(x)$ at step 91. $C_{thresh}$ is the color component threshold, x is the pixel column of the current pixel and y is the row of the current pixel. Then, $R_d=R_A(x)-R_i(x,y)$, $G_d=G_A(X)-G_i(x,y)$, $Bd=B_A(X)-B_i(x,y)$ (where $R_d$, $G_d$, and $B_d$ are the color component differences), is calculated at step 92. If $|Rd|<C_{thresh}$ and $|Gd|<C_{thresh}$ and $|Bd|<C_{thresh}$ at steps 93-95, then the incoming pixel value matches the previously sent value, and the CA count is incremented at step 99. If the match fails at any of steps 93-95, then the CA command is terminated. Thereafter, if the run existed but is now ending due to the current mismatch (at step 96), the run is encoded at step 97. If no immediately previous run existed, the pixel $R_iG_iB_i$ is encoded with other than run length encoding at step 98.

Finally a method of testing a pixel to see if it fits in a MS command (FIGS. 10A-B) is described. Recall that the make-series command is a command that fills bytes with a sequence of bits corresponding in binary value to two (and only two) color values of the two pixel colors immediately to the left of the first pixel in the make-series run. In the make-series command, two most recently sent pixel values are stored, which pixel values correspond to two different colors. All subsequent pixels in the run must be identified as coming from one or the other of those two colors, or the run terminates. First, prior to the start of the MS command, the two most recently sent pixel values must be stored. The most recently sent value is $R_{P0}$, $G_{P0}$, $B_{P0}$; the next most recently sent value is $R_{P1}$, $G_{P1}$, $B_{P1}$. Also note that these two values must differ by at least the threshold value; that is, these values are valid only if $|R_{P0}-R_{P1}|>C_{thresh}$ or $|G_{P0}-G_{P1}|>C_{thresh}$ or $|B_{P0}-B_{P1}|>C_{thresh}$, at step 102. If, at step 102, the two color values are different by the threshold, the $R_{PO}$ and $R_{P1}$ are updated at step 102A for use in steps 104 and/or 109. A different threshold value $C_{threshx}$ can be used for step 102, i.e., a different threshold than used later in steps 104-107. If step 102 fails, then the previous two pixels are not "two colors," and the current pixel is encoded using a technique other than the two-color MS command at step 103.

If the MS command applies at step 102, and $|R_{P0}-R_i|<C_{thresh}$ and $|G_{P0}-G_i|<C_{thresh}$ and $|B_{P0}-G_i|<C_{thresh}$ at steps 104-107, then the pixel can be represented as a 0 (corresponds to the first color standard) in the MS byte at the bit location for the current pixel, at step 108.

Similarly, if the MS command applies at step 102, and $|R_{P1}-R_i|<C_{thresh}$ and $|G_{P1}-G_i|<C_{thresh}$ and $|B_{P1}-G_i|<C_{thresh}$ at steps 109-112, then the pixel can be represented as a 1 (corresponding to the second color standard) in the MS byte at the bit location for the current pixel, at step 113.

If the MS command fails at any of steps 105-107 and for any of steps 110-112, then the MS command fails for the current pixel, the MS byte is created and sent, and the current pixel is encoded by some other command (other than MS) at step 103.

For each of the above scenarios $C_{thresh}$ can be determined based on the designer's choice of greater color contrast versus greater compression efficiency. In effect, the hysteresis introduces potential color information loss to what might otherwise be an essentially lossless compression scheme. The amount of loss to be tolerated through the hysteresis can be determined based on the communications bandwidth, system speed, color palette, color depth (e.g., bits per pixel color component), and other such design criteria. $C_{thresh}$ can then be assigned based on the degree of loss permitted. $C_{thresh}$ need not be identical for every run length command type, nor for every color component type, nor for evaluating match conditions versus evaluating mis-match conditions.

In one example embodiment, $C_{thresh}$ is different for one or more of the various encoding techniques employed by the algorithm. Thus, as just one illustrative example, the "no change" run length encoding technique can employ a $C_{thresh}$ different from the "copy above" or "copy left" encoding techniques. Similarly, the "copy above" and "copy left" techniques could employ the same or different thresholds, although employing the same threshold is preferred in order to address artifacts consistently in the horizontal and vertical dimensions. Similarly, thresholds for the MS commands can be the same or different from any or all of the run length encoding commands, depending upon the sensitivities desired for the different command types.

Unlike prior usages of hysteresis in video processing, in which the hysteresis was used as a filter for the video, the present systems are unusual in providing hysteresis for individually different command types within a compression algorithm. Thus, hysteresis can be tailored to a particular command type (such as by setting unique thresholds and/or unique numbers of bits evaluated for each color component), rather than to the video signal per se. In the preferred embodiment, five command types are described (copy old, copy left, copy above, make a series, and make a pixel), each of which has a hysteresis associated with it that may (or may not) be unique compared to the hysteresis characteristics of the other command types. The present systems thus improve the efficiencies of each command type and can be tailored to the unique noise sensitivities of those command types. Of course, the present invention is in no way limited to a particular one or more command types, but may be applied to tailor hysteresis to any one or combination of command types.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A video code device, comprising:
an input to receive a serial stream of color pixel values; and
an encoder to store a first one of said color pixel values, and to receive a current one of said color pixel values, wherein said encoder determines whether said current one of said color pixel values exceeds said first one of said color pixel values by less than a threshold and, if so, encodes said current pixel value by color match encoding, the encoder comprising:
a threshold analyzer to receive the current one of said color pixel values; and
a video compressor in communication with the threshold analyzer to communicate to the threshold analyzer the first one of said color pixel values comprising a previously identified one of said color pixel values in the stream of color pixel values; and wherein said threshold analyzer performs color space hysteresis on said current color pixel value to determine whether said current one of said color pixel values satisfies at least one of:
(a) a predetermined positional relationship in a current or previous frame relative to said color pixel value standard, and
(b) a predetermined positional relationship in a current run of pixels that includes another pixel having said predetermined positional relationship in a current or previous frame relative to said color pixel value standard.

2. A device as in claim 1 wherein said predetermined positional relationship is a location immediately to the left of one of said current color pixel value and said another pixel.

3. A device as in claim 1 wherein said predetermined positional relationship is a location immediately above one of said current color pixel value and said another pixel.

4. A device as in claim 1 wherein said predetermined positional relationship is a common location in an immediately prior frame relative to one of said current color pixel value and said another pixel.

5. A device as in claim 1 wherein the color space hysteresis includes defining a color palette of three dimensional color spaces, and expanding said three dimensional color spaces in three dimensions to includes portions of adjacent three dimensional color spaces.

6. A device as in claim 1 wherein the color match encoding is run-length encoding.

7. A device as in claim 1 wherein the encoder stores first and second ones of said color pixel values, and
wherein said encoder determines whether said current one of said color pixel values exceeds said first color pixel value by less than a threshold and,
if so, encodes said current pixel value as a bit having a first binary state, and
if not, determines whether said current one of said color pixel values exceeds said second color pixel value by less than a threshold and,
if so, encodes said current pixel value as a bit having a second binary state different from the first binary state.

8. A device as in claim 7 wherein the encoder stores first and second sets of said color pixel component values, and
wherein said encoder determines whether each of said current ones of said color pixel component values exceeds corresponding ones of said first color pixel component values by less than a threshold and,
if so for all such color pixel component values in said current set, encodes said current pixel value as a bit having a first binary state, and
if not for any such color pixel component values in said current set, determines whether said current ones of said color pixel component values exceed corresponding ones of said second color pixel component values by less than a threshold and,
if so for all such color pixel component values in said current set, encodes said current pixel value as a bit having a second binary state.

9. A device as in claim 1 wherein, if said encoder determines that said current one of said color pixel values exceeds said first one of said color pixel values by more than the threshold, said encoder encodes said current pixel value by creating a single byte uniquely identifying the color.

10. A device as in claim 1 wherein each of the color pixel values include color pixel component values; and the encoder stores a first set of said color pixel component values, and receives a current set of said color pixel component values, wherein said encoder determines whether each one of said current set of color pixel component values exceeds corresponding ones of said first set of color pixel component values by less than a threshold and, if so for all such color pixel component values in said current set, encodes said current pixel value by color match encoding.

11. A method, comprising:

receiving a stream of serial video data comprising pixel color values, identifying a current one of said pixel color values, identifying first and second standard pixel color values equal to two different prior pixel color values immediately adjacent a run of pixels including the current one of said pixel color values, determining by how much the current one of said pixel color values exceeds the first standard pixel color value;

if said current one of said pixel color values exceeds the first standard pixel color value by less than a predetermined threshold, encoding said current one of said pixel color values by bit-based encoding where said bits are encoded to one of two binary states corresponding with, respectively, said first standard pixel color value;

if said current one of said pixel color values exceeds the first standard pixel color value by more than the predetermined threshold:

determining whether the current one of said pixel color values exceeds the second standard pixel color value; and if said current one of said pixel color values exceeds the second standard pixel color value by less than a predetermined threshold, encoding said current one of said pixel color values by bit-based encoding where said bits are encoded to one of two binary states corresponding with said second standard pixel color value.

12. A method as in claim 11 wherein the color match encoding is run-length encoding.

13. A method as in claim 12 wherein said predetermined positional relationship is a location immediately to the left of a run including said current color pixel value.

14. A method as in claim 12 wherein said predetermined positional relationship is a location immediately above a start of a run including said current color pixel value.

15. A method as in claim 12 wherein said predetermined positional relationship is a common location in an immediately prior frame relative to a start of a run including said current pixel color value.

16. A method as in claim 11 wherein:

each of said pixel color values comprise plural pixel component values;

said step of determining by how much the current one of said pixel color values exceeds the first standard pixel color value includes determining by how much each pixel component value in said current one of said pixel color values exceeds corresponding ones of said first standard pixel color component values;

if all of said current pixel component values for said current one of said pixel color values exceed all of said corresponding ones of said first standard pixel color component values by less than a predetermined threshold, encoding said current pixel color component values by bit-based encoding where said bits are encoded to one of two binary states corresponding with, respectively, said first standard pixel color component values;

if any of said current pixel component values for said current one of said pixel color values exceeds any of said first standard pixel component color values by more than the predetermined threshold:

said step of determining whether the current one of said pixel color values exceeds the second standard pixel color value includes determining whether each pixel component value in said current one of said pixel color values exceeds corresponding ones of said second standard pixel color component values; and if all of said current pixel component values exceed all of said corresponding one of said second standard pixel color component values by less than a predetermined threshold, encoding said current pixel color component values by bit-based encoding where said bits are encoded to one of two binary states corresponding with, respectively, said second standard pixel component color values.

* * * * *